(No Model.) 7 Sheets—Sheet 1.

A. CONACHER.
REFRIGERATING MACHINE.

No. 396,730. Patented Jan. 29, 1889.

FIG. I.

ATTEST-
Harry L. Amer.
I. J. Masson

INVENTOR-
Alexander Conacher
by E. E. Masson
atty (No Model.) 7 Sheets—Sheet 3.

A. CONACHER.
REFRIGERATING MACHINE.

No. 396,730. Patented Jan. 29, 1889.

(No Model.) 7 Sheets—Sheet 5.

A. CONACHER.
REFRIGERATING MACHINE.

No. 396,730. Patented Jan. 29, 1889.

ATTEST—
Harry L. Amer
J. J. Masson

INVENTOR—
Alexander Conacher,
by E. E. Masson
atty.

(No Model.) 7 Sheets—Sheet 6.

A. CONACHER.
REFRIGERATING MACHINE.

No. 396,730. Patented Jan. 29, 1889.

ATTEST—
Harry L. Amer.
J.J. Masson

INVENTOR—
Alexander Conacher
by E.E. Masson
atty.

(No Model.) 7 Sheets—Sheet 7.

A. CONACHER.
REFRIGERATING MACHINE.

No. 396,730. Patented Jan. 29, 1889.

ATTEST -
Harry L. Amer
I. J. Masson

INVENTOR -
Alexander Conacher
by E.E. Masson
atty.

UNITED STATES PATENT OFFICE.

ALEXANDER CONACHER, OF WINDSOR, COUNTY OF BERKS, ENGLAND.

REFRIGERATING-MACHINE.

SPECIFICATION forming part of Letters Patent No. 396,730, dated January 29, 1889.

Application filed May 10, 1888. Serial No. 273,424. (No model.)

*To all whom it may concern:*

Be it known that I, ALEXANDER CONACHER, a subject of the Queen of Great Britain, residing at Windsor, in the county of Berks, in England, have invented certain new and useful Improvements in Refrigerating-Machines, of which the following is a specification, reference being had therein to the accompanying drawings.

The object of this improvement is to obtain cold or ice by exposing water to a high vacuum and causing the vapor leaving the water to pass over the surface of sulphuric acid or other great absorbent of water or aqueous vapor.

The apparatus consists of an absorber or vessel to contain sulphuric acid, a vessel to contain the water to be frozen, means for automatically admitting the water intermittently in the apparatus, with pipes and cocks connecting them, the whole used in connection with an air-pump specifically set forth and claimed in a companion pending application, or with other suitable vacuum-pump.

In the accompanying drawings.

Figure 1:
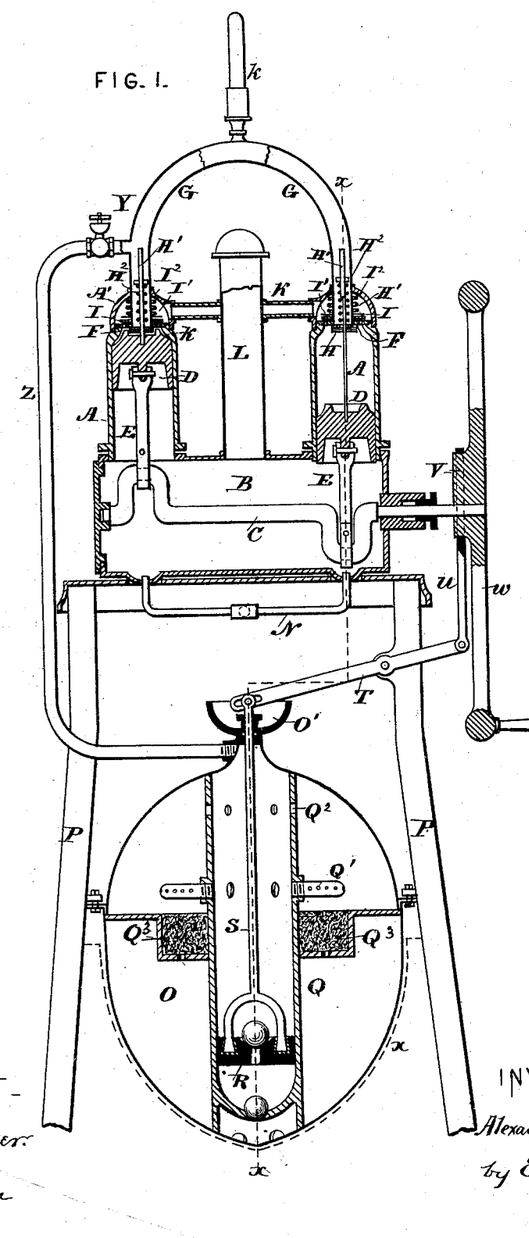
Figure 1 is a longitudinal vertical section of a machine constructed in accordance with my invention.

This refrigerating-machine is provided with an air-pump, consisting of two vertical pump-barrels, A, resting on a horizontal closed chamber, B, that is provided with a crank-shaft, C, passing through it, one end having a bearing in a boss in the interior on one end of the chamber B and the other end passing out through a bearing and stuffing-box in the opposite end. The boss and the stuffing-box may be secured on the ends of the chamber B. This crank-shaft has two cranks placed oppositely to each other, each of which is directly below the center of one of the pump-barrels A. The pistons D are operated from the cranks by the connecting-rods E. The tops of the barrels are domed, and in the center of the dome part A' a circular metal plate, F, is seated, having the seats of the suction and discharge valves of the pump. The suction-pipe G, leading to the pump-barrel, is screwed into a recess bored down into the plate F or otherwise united thereto.

*k* is a vacuum-gage on top of the pipe G.

The suction-valve H is made of a metal disk with "dermatine" or leather, or other suitable material not affected by hydrocarbon oils, and it takes its seat against the under side of the plate F. Within the lower end of the pipe G is placed a tubular stem of the suction-valve. Said stem H' is closed at the top, and passes through the plate F and extends within the pipe G for a length exceeding the length of the stroke of the pump.

The discharge-valve I consists of an annular disk, of dermatine or other suitable material, resting on top of the plate F, which has a number of holes drilled through it to form outlets from the pump-barrel. In the side of the dome A' there is an outlet to receive the discharge-pipe K, the bottom thereof being slightly above the level of the seating of the discharge-valve I. This pipe K leads from each barrel into the trap-cylinder L, placed on top of the chamber B and communicating therewith. This trap-cylinder is open to the air at the top, but covered with a light cover.

The pump-pistons D have their upper ends made to fit the shape of the pump-barrels and the bottom of the suction-valve. Each discharge-valve has a metal washer, I', on top and is held to its seat by a spiral spring, I², and the valves H are held to their seats by spiral springs H². The crank-shaft is revolved by hand or other power in the usual way.

A hydrocarbon oil having a boiling-point of 450° to 600° Fahrenheit is poured into the pump until it fills the whole space up to the under side of the pistons D and fills part of the trap-cylinder L. A small gutter or depression is left in the chamber B under each crank and provided with a pipe, N, and cock to empty the pump.

One of the acid-vessels is represented at O. It is made of cast-iron enameled inside to resist the acid and made in halves joined by flanges and bolts and fixed in the framing P of the machine. In order to mix or agitate the acid thoroughly while it absorbs the watery vapor and to prevent the formation of a thick upper layer of weak acid, which would retard the freezing operation, and to insure the complete absorption of the aqueous vapors in the absorber, I provide a circulating-pump, Q, made of enameled iron or of earthenware and held between the top and bottom parts of the said vessel O. The pump-valves may be made of balls shaped as shown. The bucket R is by preference of earthenware, the lower end of the bucket-rod S being secured therein by lead run in. The rod S, which is enameled, passes up through a stuffing-box formed with the cup O' for holding water for effectually liquid-sealing.

Figure 2:
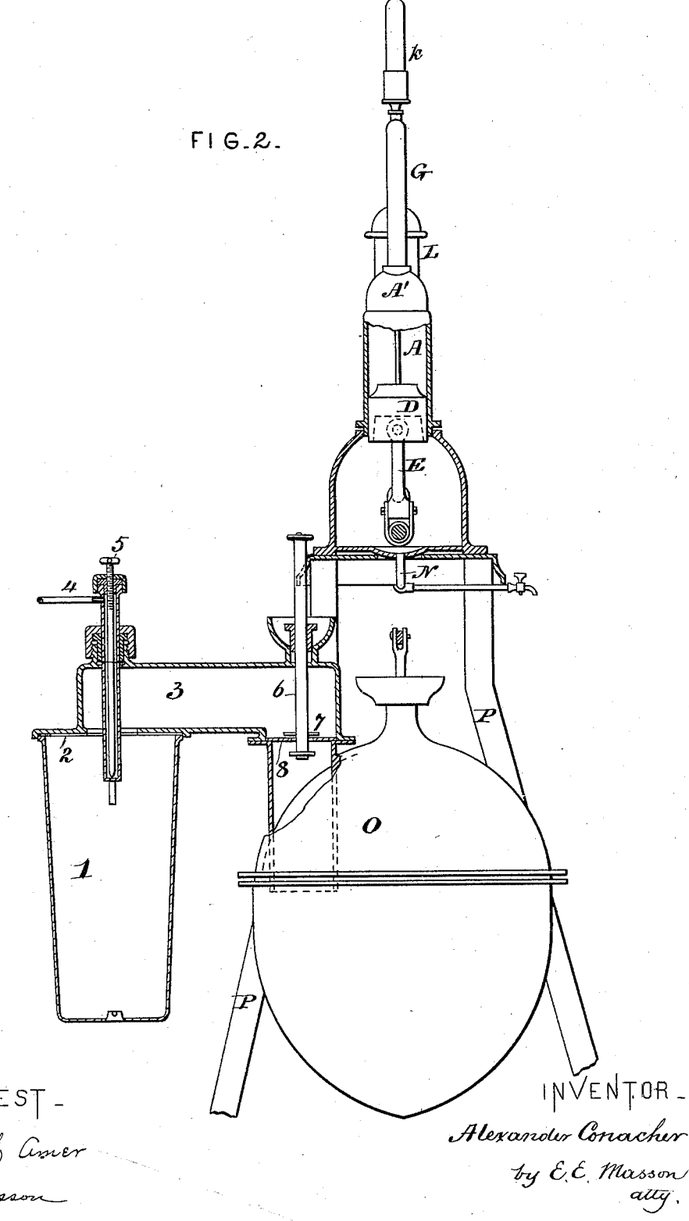
Fig. 2 is a transverse vertical section on line *x x* of Fig. 1.

The barrel Q has perforated pipes Q', for producing a spray or shower of acid, and holes Q², for relieving or removing any surplus acid pumped up. The pump-rod S is pivoted to a lever, T, pivoted to the framing P and caused to reciprocate by an eccentric-rod, $u$, from an eccentric, V, on the boss of the fly-wheel W or other driving part of the crank-shaft $c$. The densest acid drawn from the bottom of the vessel O will thus pass through the perforated pipes Q' and holes Q² and be poured as a shower over the surface of the acid of over a receiver, Q³, containing porous substances, as pumice-stone, and thence into the acid. This surface acid, having absorbed aqueous vapor, has been momentarily weakened; but it has thus been again strengthened and made more effective as an absorbent by this strong acid. When the acid has become too weak to work with, it is strengthened as follows: A quantity of the hydrocarbon oil before referred to is poured into the trough or bath X, (shown in dotted lines,) suspended around the lower part of the absorber, and heat is applied to the trough X by means of a gas-burner or other furnace attached to it. It is heated to 200° or 300° Fahrenheit, and when this temperature is registered on a thermometer inserted in the bath the pumps A A and chamber B are emptied of their charge of oil by means of the pipes N and cocks underneath and are charged with water, the valve Y on the pipe Z being open for communication between the acid-vessel O and the top of the pump. The pump is then operated, and under the vacuum formed the watery vapor leaves the acid in the vessel O and is drawn through the pump A A. When the acid has been sufficiently concentrated, the oil is drained out of the bath X through a cock at its lowest part, and the bath is filled with cold water to cool the hot acid. When cooled and the pump recharged with oil, the machine is again ready for work. The same bath, X, is also, during the freezing process, kept supplied with a flow of cold water to prevent the acid in the vessel O from becoming too hot. For freezing large blocks of ice a high cone-shaped glass vessel is suitable, such as 1, Fig. 2. Its upper or wide end is open and fits on a ring, 2, of rubber, which is seated in a recess cut into the bottom flange of the passage 3, leading to the absorber O. The water to be frozen may be introduced by a small pipe, 4, and valve 5 inserted into it; but this method of admitting the water in a constant fine stream has a tendency to produce porous or honey-combed ice, in contradistinction of the dense solid ice produced by the automatic intermittent flow hereinafter described, and shown in Figs. 8, 9, 10, 12, and 13.

Figure 3:
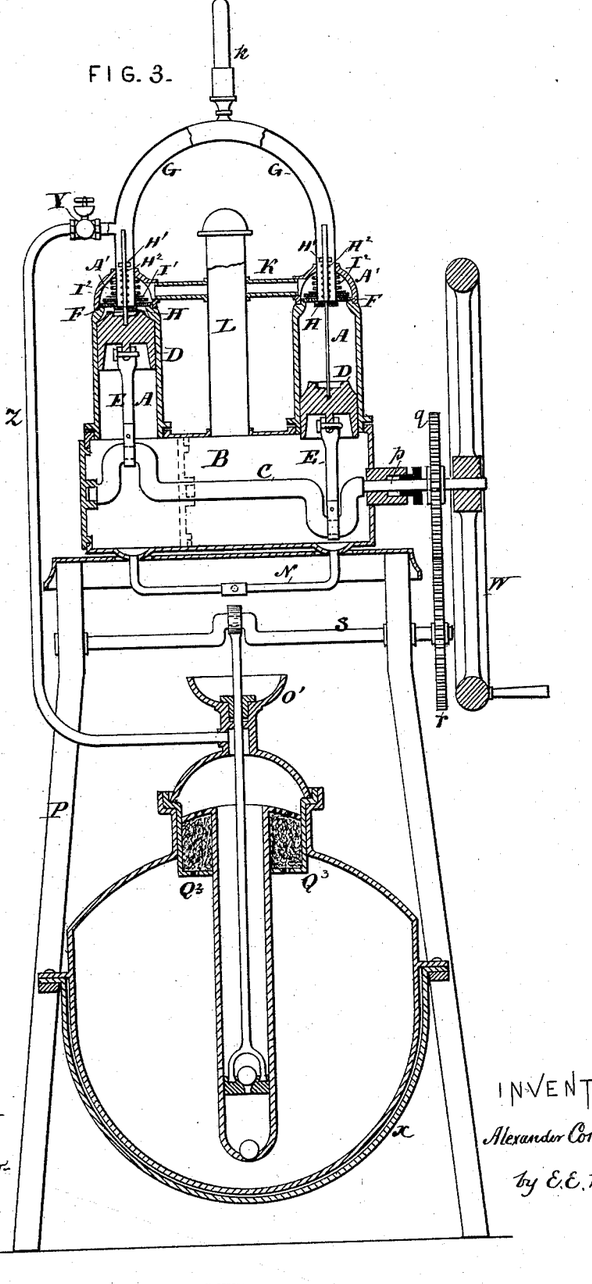
Fig. 3 is a longitudinal vertical section of a machine embodying my invention, showing the pump-shaft operated by gearing from the main shaft.
Figure 4:
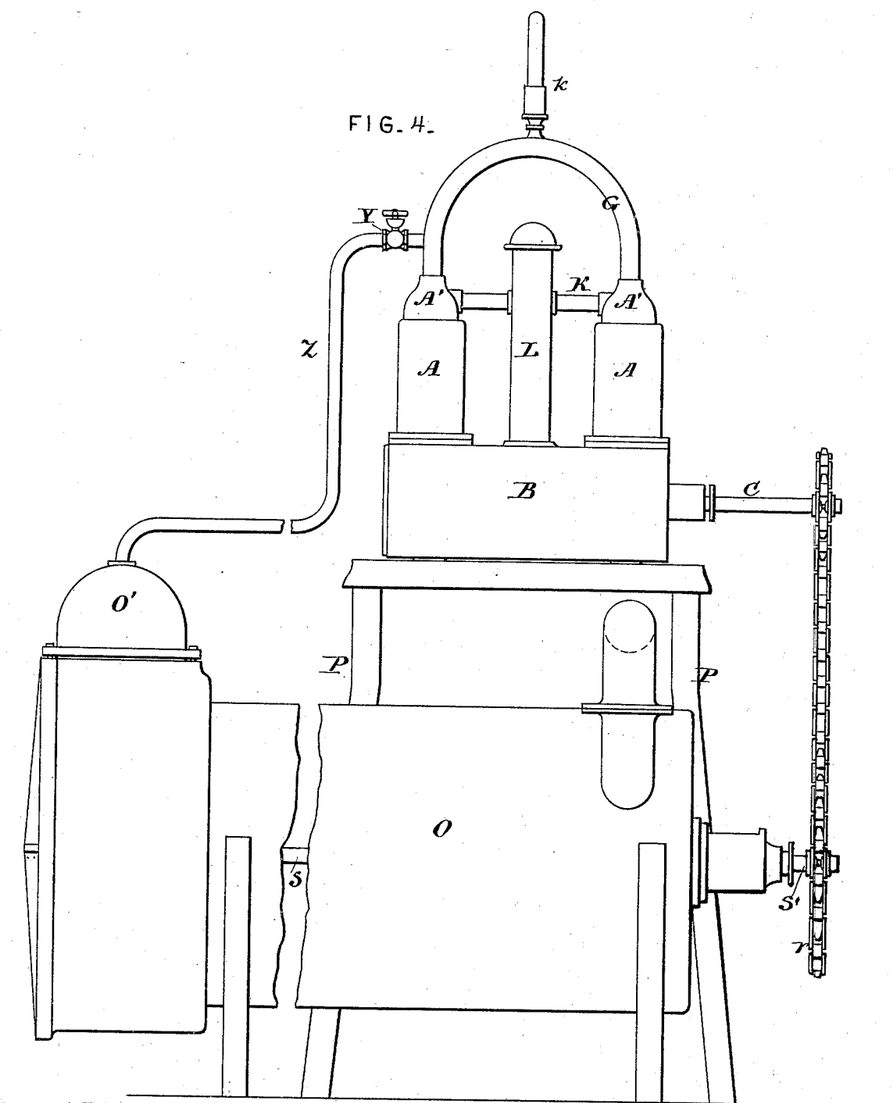
Fig. 4 is a side view of a machine embodying my invention, but provided with a larger vapor-absorber vessel, and consequently of greater working capacity.
Figure 5:
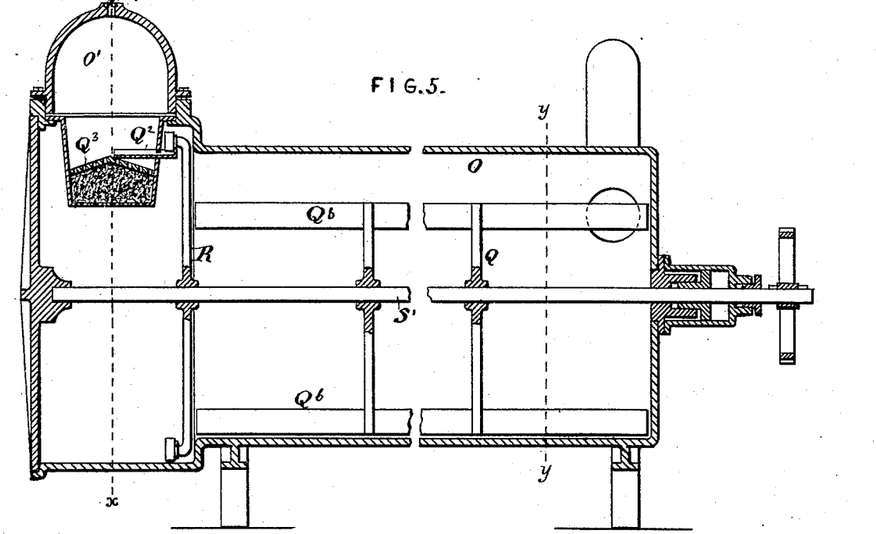
Fig. 5 is a longitudinal vertical section of the same.
Figure 6:
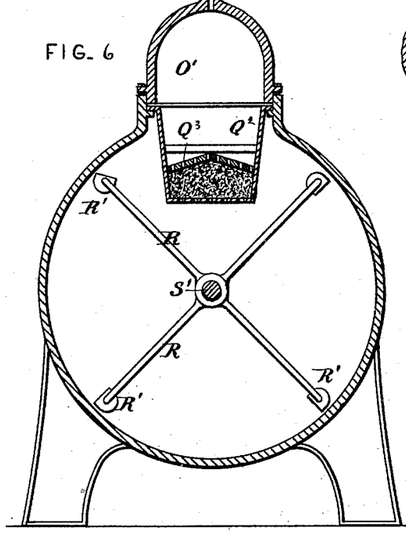
Fig. 6 is a transverse vertical section on line *x x* of Fig. 5.
Figure 7:
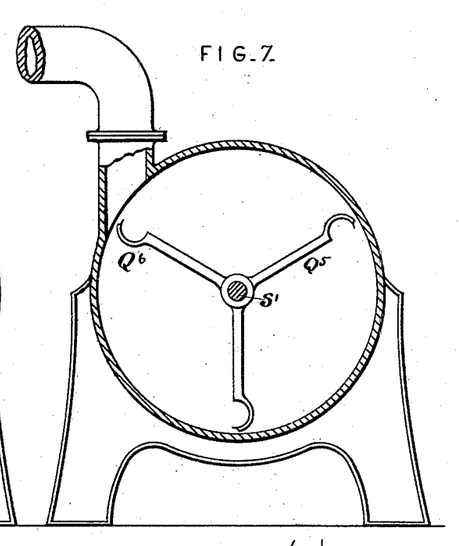
Fig. 7 is a transverse vertical section on line *y y* of Fig. 5.

Fig. 3 shows a modified construction of the absorber, or rather of the parts for circulating the acid, that I found to be best in practice. The pump Q is made smaller than in Fig. 1. and is surrounded by a jacket, Q³, containing pieces of pumice-stone or the like and having a grid top and bottom. The acid pumped up descends through the pumice-stone and through the lower grating of the jacket like a shower.

In Figs. 4, 5, 6, and 7 the acid-vessel O is made of such a form that it can conveniently be made of cast-iron enameled inside to withstand the acid, and is provided with an enameled-iron spindle, $s'$, having arms $Q^5$, with half-round trough-shaped agitators $Q^6$, (all enameled,) which continually bring the heavier parts of the acid up from the bottom and discharge it upon the surface; but rotary agitators have heretofore been used for the same purpose. On the spindle $s'$ are also mounted arms R, which are provided with cups R', all of enameled iron. These latter continually raise heavy acid from the lowest part of a chamber formed at one end of the acid-vessel and empty it into a trapped trough, Q², whence it overflows onto the upper grating or cover of the pumice-stone trap Q'.

The watery vapor rising up through the pumice-stone or other material (already described) in the box or trap meets the acid descending through the interstices of such material and is absorbed by it. The spindle $s'$ passes out through a stuffing-box with water-sealing arrangements, as shown, and is worked from the shaft C of the machine or pump in any suitable manner.

I shall now describe the means which I have found suitable for introducing the water to be frozen in the regular intermittent manner alluded to instead of the admission by a constant flow, as heretofore.

Figures 8, 9, 10:
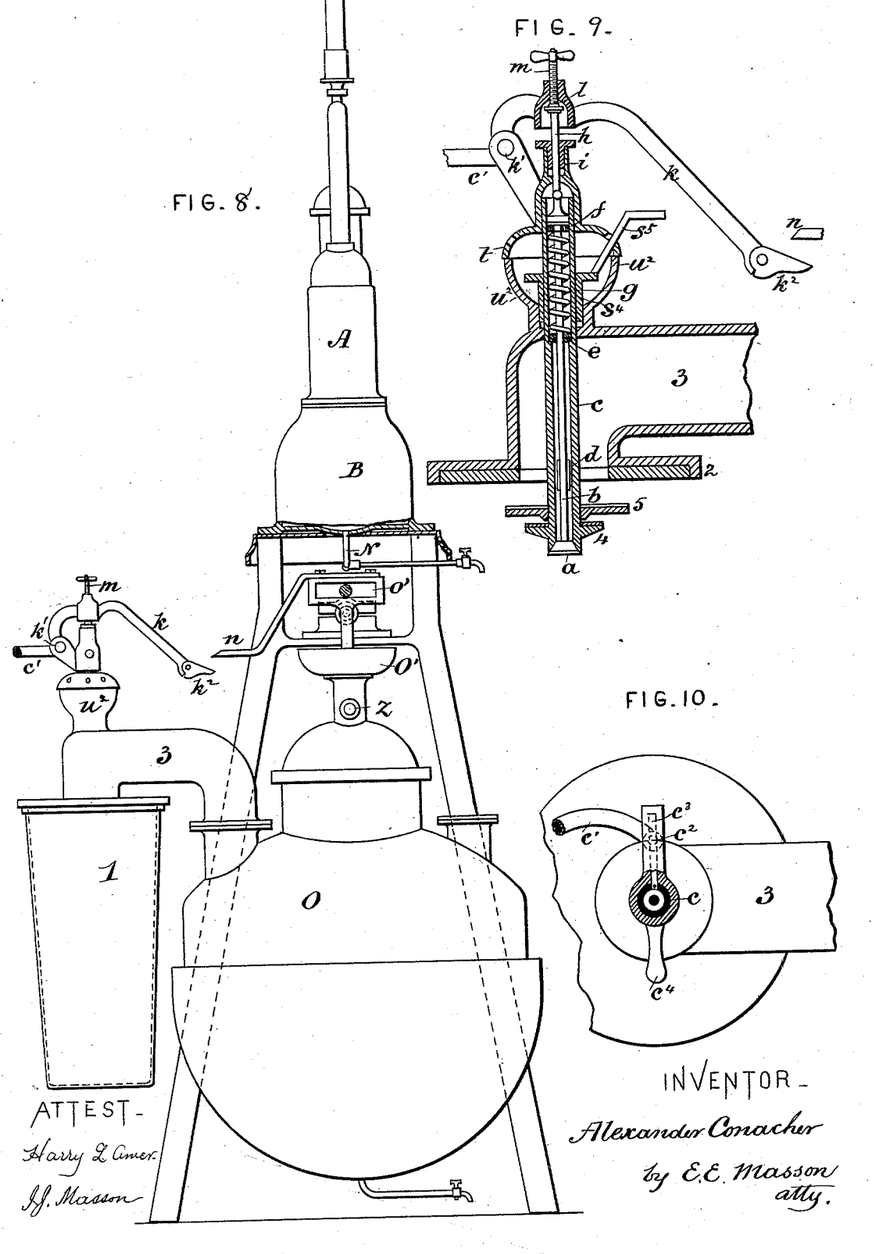
Fig. 8 is a side view, partly in section, of the machine shown in Fig. 3.
Fig. 9 is a vertical section, on an enlarged scale, of the parts relating to the novel mode of automatically admitting the water to be frozen.
Fig. 10 is a sectional plan of the same.

The water to be frozen is admitted to the vessel 1, Figs. 8, 9, and 10, the upper flange of which seats itself against the rubber joint-ring, which fits in a recess formed on the under side of the pipe 3, that communicates with the upper part of the acid-vessel O. For the intermittent water admission to the freezing-vessel 1, Fig. 8, I use a valve, $a$, Fig. 9. The spindle $b$ of same passes up through a tube, $c$, being guided therein at $d$ and by the disk $e$, which latter is perforated for the passage of the water. The end of the spindle $b$ has a disk, $f$, also perforated, between which and the disk $e$, I provide a helical spring, $g$, which tends to close the valve $a$. $h$ is a rod for depressing the spindle $b$ and thus opening the valve $a$. This rod $h$ passes through a stuffing-box at $i$, and is depressed by the lever $k$, having its fulcrum at $k'$ and formed with a head, $l$, with adjusting-screw $m$, the lower end of which comes against the end of rod $h$. The lever $k$ is intermittently depressed by the rod $n$, Fig. 8, which comes against a finger, $k^2$, jointed to the lever $k$. The rod $n$ is attached to the slotted crank-head $o'$, Fig. 8, and receives an up-and-down motion from the same.

The water to be frozen is admitted to the interior of the hollow stem $c$ by a flexible tube, $c'$, Fig. 10, attached to an inlet-shank, $c^2$, on the hollow handle $c^3$, opposite to which there is a solid handle, $c^4$. The handles $c^3$ $c^4$ serve to raise and lower the hollow stem $c$ when the valves 4 and 5 are to be closed or opened, as will be presently described. In the downstroke of the crank-head $o'$ the rod $n$, acting on the finger $k^2$, depresses the lever $k$, and thereby opens the valve $a$ for an instant, while in the upstroke the rod $n$ raises the finger $k^2$ and goes past it. The screw $m$ serves to regulate the amount of opening of the valve $a$ as it changes the angle or inclination of the lever $k$, and consequently modifies the amount of contact of the finger $k^2$ with the rod $n$. The hollow stem $c$ passes out through a stuffing-box gland, $s^4$, which can be turned by the handle $s^5$. The latter passes out through a slot in the cap $t$, which is free to turn in its place. The cup-shaped part $u^2$ of the casting 3 is kept charged with water, so as to lute the stuffing-box gland $s^4$. When the freezing-vessel 1 has become sufficiently filled with ice and an empty vessel is to take its place, I first lift the stem $c$ by taking hold of the handles $c^3$ $c^4$, and thus close the valve 4 against the valve 5, and the latter then against the joint-washer 2, the valve 5 not being attached to the stem $c$ or valve 4, but being loosely supported by the latter. Communication is then cut off from the acid-vessel O, and the vacuum is retained in it. Air is then admitted through the valve $a$ or by a small valve (not shown in the drawings) to the vessel 1, so as to destroy the vacuum therein. The vessel 1 can then be detached and an empty vessel substituted. The small valve 4 is then first depressed and opened against the vacuum above it, and then the large valve 5 can be easily depressed. The vessel 1, being then in communication with the other portions of the machine in which a vacuum had been retained, is held securely in its place against the rubber joint-washer 2, and the machine being started again and a sufficient vacuum obtained the intermittent water admission to the vessel 1 is commenced, as before.

When operating the vacuum-pump to obtain a sufficient vacuum before starting the freezing operation, the acid-pump is put out of gear by pushing the spur-wheel $r$ along farther on its shaft $s$, Fig. 3, until it is out of gear with the spur-wheel $q$. When a sufficient vacuum is obtained to produce ice, the spur-wheel $r$ is put in gear again and the acid-pump operated from it.

Figure 11:
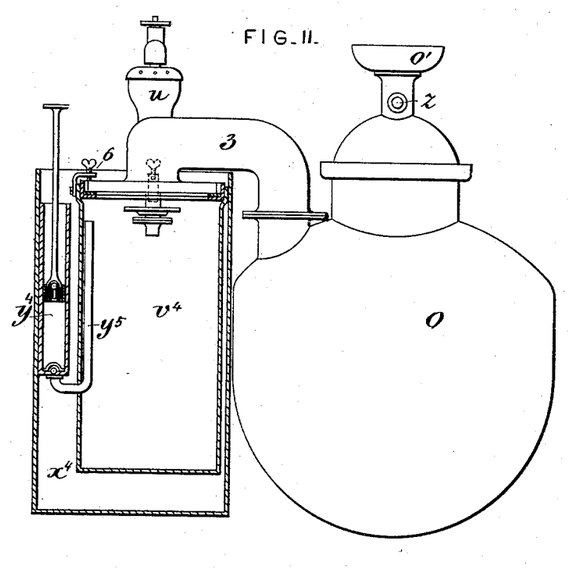
Fig. 11 represents the acid-vessel in side elevation with parts connected therewith in vertical section.

Fig. 11 is a part-sectional elevation of the acid-vessel and parts connected therewith, illustrative of a mode of reconcentrating the acid. In place of the freezing-vessel, which has been temporarily removed, I attach, by means of screw-clamps 6 or other suitable means, a vessel, $v^4$, to which is connected or attached an outer vessel, $x^4$, provided with a hand-pump, $y^4$, for forming a partial vacuum. The outer vessel, $x^4$, is kept full of cold water by a constant flow, and the water, covering the flange for connecting it to the pipe 3, insures a tight lute-joint at this place. The suction end of the pump is by a pipe, $y^5$, connected with the upper part of the inner vessel, $v^4$. The absorber is then heated by any suitable means—such as a gas-stove, an oil-stove, or by a furnace applied directly to the absorber, or by a bath containing oil around it—and the connections between the acid-vessel O and the pump A of the machine being shut off by the valve Y, Fig. 1, a partial vacuum is produced in the acid-vessel O and the vessel $v$ by working the pump $y$, Fig. 11. Under the partial vacuum and the heat applied to the outside of the acid-vessel O, as already described, the watery parts of the acid therein will be evaporated and the vapors will be drawn by the pump $y$ into the vessel $v$ and effectually condensed therein, thus reconcentrating the acid.

Instead of reconcentrating by the aid of a vacuum I am, as already stated, by reason of employing an enameled-iron absorber, enabled to reconcentrate under atmospheric pressure. In such case I shut off communication with the vacuum-pump A, Fig. 1, and dispense with the vacuum-pump $y$, Fig. 11, and apply direct heat by any suitable means to the absorber and lead off the vapors in any convenient way into the atmosphere. I find that the enameled-iron absorber effectually withstands such high and direct heat as is required for this method of reconcentration.

Figure 12:
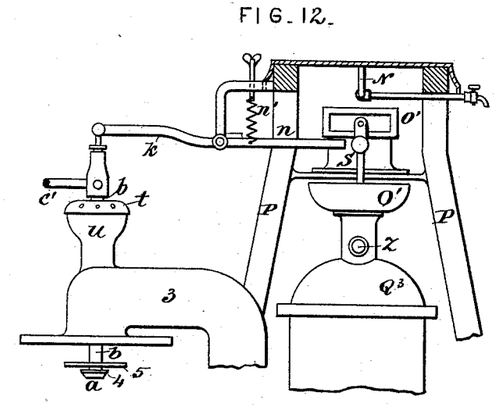
Fig. 12 represents, in side elevation and partly in section, modified means for automatically admitting intermittently the water to be frozen.

Fig. 12 is a part side elevation illustrating another mode of actuating the valve for intermittent water-supply to the freezing-vessels. In this case the crank which operates the slotted cross-head $o'$ on the upper end of the valve-spindle $s'$ will in its downstroke depress the arm $n$ of a double-armed lever, thereby distending the spring $n'$ and raising the other arm, $k$, which has a hammer head or knob on its end. When the crank lets go the arm $n$, the spring $n'$ will pull it up, and the hammer at the end of the arm $k$ will thereby impart a smart blow to the head of the spindle $b$ of the water-admission valve $a$, thus opening the latter for an instant, these parts being constructed as shown in Fig. 13.

Figure 13:
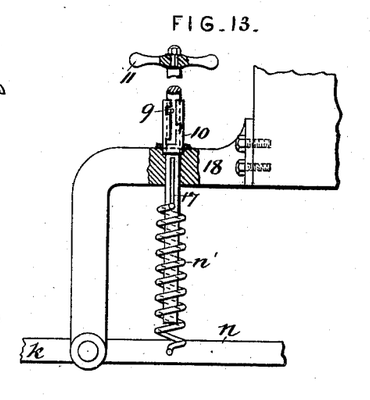
Fig. 13 is a detail view, on a larger scale, of the means for regulating the stroke imparted to the valve-spindle.

Fig. 13 is a detail view showing the means for regulating the stroke imparted to the valve-spindle. To the arm $n$ is attached a helical spring, $n'$, the upper end of which rests in the bottom of a slot in a rod, 17, which passes through the bracket 18 and is provided with a pin, 9. On bracket 18 is fixed a socket, 10, with a slot and cross-slots like a bayonet-joint for the pin 9 to work in. By taking hold of the crutch-handle 11 the rod 17 can be raised or lowered and the pin 9 entered into any one of the cross-slots, (three such being shown here as an example,) by which means the tension of the spring $n'$ is increased or diminished as desired for enabling the hammer-arm $k$ to give a stronger or lighter blow to the valve-stem, so that the valve $a$ thus admits more or less water to the interior of the freezing-vessel 1 each time the valve $a$ is opened. By admitting the water intermittently in this manner the ice can be formed in solid blocks, as the water admitted at each stroke given to the valve-stem is forced to the bottom of the freezing-vessel or onto the surface of the ice formed on the bottom of that vessel and there freezes, and a block corresponding in size to the interior of the vessel is formed, whereas with a continuous flow of water into the freezing-vessel the ice forms into icicles and sprays on the sides of the vessel, forming a hollow block or cylinder of ice. When the rod 17 is pushed down, so that the pin 9 can be extended into the lowest cross-slot, the lever $n$ is depressed so far as to be out of reach of the actuating-crank, and hence is at rest or inactive, no water being then admitted to the freezing-vessel.

To operate the machine shown in Figs. 3, 8, and 9 so as to instantaneously produce solid ice in blocks, the valve 5, Fig. 9, is first closed against the rubber disk 2 by raising the stem $c$. The vacuum-pump is then operated until a partial vacuum is formed in the acid-vessel and pipe 3. The glass cylinder is then held up to the rubber disk and the stem $c$ depressed, thus making communication between the interiors of the glass freezing-vessel and the acid-vessel and causing the glass vessel to become seated on the rubber by means of the vacuum so formed. The vacuum-pump is now operated until a sufficient vacuum is obtained to freeze water, which amount of vacuum is determined by the conversion into ice of a small quantity of water previously admitted into the freezing-vessel. The wheel $r$, which in the beginning was out of gear with the wheel $q$ on the driving-shaft, is slid on a feather along the shaft $s^2$ and operates the acid-pump Q. This latter raises the acid and distributes it over the surface of the perforated plate $Q'$, whence it descends through the interstices of the pumice-stone and falls in a shower onto the surface of the acid underneath. The quantity of acid put into the acid-vessel is sufficient to nearly fill half the space between the bottom of the vessel and the bottom of the pumice-stone trap. If the mode of admitting water shown in Figs. 12 and 13 is used, the pin 9 is first placed in the lowest cross-notch of slotted sleeve 10, so that the lever $n$ is depressed below the reach of crank or shaft $s^2$. By raising the handle 11 and entering the pin in either of the slots above the lowest one the lever $n$ is operated by the crank on shaft $s^2$ at each revolution made by the latter, and under the impulse of the spring $n'$ causes the knob or hammer on the end of the lever $k$ to strike a blow on the end of the stem of valve $a$, thus opening it for an instant and allowing a small amount of water to be injected into the vessel 1. The valve $a$, being cone-shaped and ground in a seat of corresponding shape, directs the water downward and outward. As it falls a small portion of it is vaporized, the balance is instantly congealed, and as the process is continued a solid block of ice is formed on the entire bottom of the freezing-vessel, which increases in size and height until the block fills the vessel nearly to the bottom of the valve $a$, if desired. When sufficient ice has been made, air is admitted to the freezing-vessel 1 by opening valve $a$ or by a small air-valve, (not shown,) and the vacuum being thus destroyed the vessel 1 becomes detached from the flange 2.

During the above process of freezing the aqueous vapor passing into the absorber is entirely absorbed, partly by the surface acid, but principally by meeting the acid in a finely-divided condition in the interstices of the pumice-stone suspended above it. By this method of compelling every particle of vapor to come in contact with the acid in a finely-divided condition the operation of freezing can be continued after the acid has become heated to 160° or 180° Fahrenheit, as the watery vapor is so well absorbed, while with an ordinary acid-agitator the aqueous vapors generally pass into the vacuum-pump and destroy the vacuum necessary to freeze water after the acid became heated to 90° or 100° Fahrenheit. Thus by using the pumice-stone strainer the capacity of the machine making ice at one operation is increased immensely, from five to ten fold, such increase depending on the initial temperature of the acid. It also enables me to continue making ice with weaker acid than could be used with an ordinary agitator, as the effect of imperfect absorption of the vapor is that part passes into the vacuum-pump, impairing the vacuum and retarding or entirely preventing freezing. By using a cast-iron acid-holder, enameled to withstand acid I am enabled to reconcentrate the charge of acid in it without removing it from the vessel by simply heating it with gas from burners or an oil-stove, or by any heat-producing means most convenient, and leading the aqueous vapors separated by the heat through an opening provided for that purpose, as shown at $o^4$, Fig. 8. This enables me to use a single charge of acid repeatedly. The bath X, Figs. 3 and 8, can be placed under the absorber to cool the acid during the freezing operation by causing flowing water to pass through it.

Having now fully described my invention, I claim—

1. In a refrigerating-machine, the combination of a vacuum-pump, a pipe leading from said pump to an absorbing-vessel containing sulphuric acid, a liquid stirrer and elevator within said absorber, a perforated partition between the surface of the acid in the absorber and the air-pipe leading therefrom to the pump, and a porous or liquid-diffusing substance, as described, upon said perforated partition, with an air-sealed vessel having a pipe-connection with the absorber, substantially as and for the purpose described.

2. In a refrigerating-machine, the combination of a vacuum-pump, a pipe leading from said pump to an absorbing-vessel named an "absorber," containing sulphuric acid, a liquid-elevator within said absorber, a perforated partition between the surface of the acid in the absorber and the air-pipe leading therefrom to the pump, and vapor and a porous or liquid-diffusing material, substantially as described, upon said perforated partition, with an air-sealed vessel having a pipe-connection with the absorber, and means, substantially as described, for automatically admitting intermittently at regular intervals of time conical jets of water projected downward into said air-sealed vessel, substantially as set forth.

3. The combination, with the freezing-vessel, the supply-pipe, and its spring-seated valve, of the hammer above the valve-stem and the trip, constructed and arranged as described, to be actuated by the pump-operating means, whereby the water to be frozen is automatically and intermittently injected in small quantities into the freezing-vessel.

In testimony whereof I affix my signature in presence of two witnesses.

ALEXANDER CONACHER.

Witnesses:
   H. B. HORLOCK,
   HUGH HUGHES,
*Both of* 191 *Fleet Street, London, E. C.*